(12) United States Patent
Mukaide et al.

(10) Patent No.: US 7,569,617 B2
(45) Date of Patent: Aug. 4, 2009

(54) METHOD AND INSTRUMENT OF POLYMER PROCESSING TREATMENT

(75) Inventors: Masaaki Mukaide, Hitachinaka (JP); Toshiharu Goto, Hitachi (JP); Takanori Yamazaki, Mito (JP); Yoshihiko Iwamoto, Hiroshima (JP); Jun Kakizaki, Hiroshima (JP)

(73) Assignees: Hitachi, Ltd., Tokyo (JP); The Japan Steel Works, Ltd., Tokyo (JP); Hitachi Cable, Ltd., Tokyo (JP)

( * ) Notice: Subject to any disclaimer, the term of this patent is extended or adjusted under 35 U.S.C. 154(b) by 597 days.

(21) Appl. No.: 10/886,634

(22) Filed: Jul. 9, 2004

(65) Prior Publication Data

US 2005/0009935 A1    Jan. 13, 2005

(30) Foreign Application Priority Data

Jul. 11, 2003  (JP) .............................. 2003-195425

(51) Int. Cl.
*C08J 11/04*  (2006.01)
(52) U.S. Cl. ...................... 521/40.5; 521/41; 521/44; 521/47; 521/48.5
(58) Field of Classification Search ............... 521/40.5, 521/41, 44, 47, 48.5
See application file for complete search history.

(56) References Cited

U.S. PATENT DOCUMENTS 4,051,212 A    9/1977  Grigat 6,090,862 A    7/2000  Tatsuda et al.
2002/0135098 A1 *  9/2002  Kawai et al. ................ 264/143

FOREIGN PATENT DOCUMENTS

| EP | 0582300 | 2/1994 |
|---|---|---|
| EP | 0739701 | 10/1996 |
| JP | A-8-300352 | 11/1996 |
| JP | 2000-198877 | 7/2000 |
| JP | 2001-253967 | 9/2001 |
| JP | 2002-249618 | 9/2002 |
| JP | 2002-332380 | 11/2002 |

* cited by examiner

*Primary Examiner*—Edward J Cain
(74) *Attorney, Agent, or Firm*—Antonelli, Terry, Stout & Kraus, LLP.

(57) ABSTRACT

The object of the present invention resides in providing a method and instrument of polymer processing treatment, wherein a sudden pressure change due to expansion by gasification of a reactant when it is exhausted from a reacting extruder is given in a little amount to a molding machine for a treated substance, and a change in the amount of the material supplied to the molding machine and a variation in molding are little, and hence continuous and uniform molding is possible. That is, the method of the present invention resides in a method of polymer processing treatment, which includes the steps of: reacting a polymer with a reactant under mixing and stirring at a high temperature and a high pressure in the inside of a reacting extruder to produce the treated substance; introducing said treated substance and a remaining reactant into a reactant-separation tank to separate the treated substance and the reactant; and molding the separated treated substance.

13 Claims, 3 Drawing Sheets

METHOD AND INSTRUMENT OF POLYMER PROCESSING TREATMENT

FIELD OF THE INVENTION

The present invention relates to a method of polymer processing treatment wherein the polymer is subjected to a degeneration reaction or a decomposition reaction or a crosslinking bond or molecular chain of a crosslinked polymer is cut to produce a thermo-plastic resin or a wax, and also to an instrument therefor, and particularly relates to a novel method of polymer processing treatment which comprises reacting a polymer with a reactant in supercritical state by use of an extruder, and also to an instrument therefor.

BACKGROUND OF THE INVENTION

As conventional techniques, in JP-A-8-300352, a thermoplastic resin having a thermosetting resin coating film is mixed with a primary or secondary amine as a coating film-decomposing agent by use of an extruder to reproduce a thermoplastic resin under the conditions of a temperature of 200-300° C. and a pressure of 10-100 kg/cm$^2$.

Furthermore, JP-A-2001-253967 discloses a process which comprises supplying a crosslinked polyethylene and water to an extruder and extruding them under the conditions making water supercritical or subcritical in the extruder, that is, at a temperature of 200-1000° C. and a pressure of 2-100 MPa to produce a thermoplastic material.

JP-A-2002-249618 discloses that a crosslinked polymer is extruded from an extruder and is introduced into a reactor together with a fluid of high temperature and high pressure to produce a reaction product, which is introduced into a separator to separate the reaction product and the high temperature fluid, and the reaction product is exhausted to the outside by use of an extruder.

JP-A-2000-198877 discloses that a thermosetting resin is reacted with a decomposing liquid in an extruder and, after the reaction, the decomposing liquid and a solid insoluble in the decomposing liquid are treated with a centrifuge in a solid-liquid-separating tank.

SUMMARY OF THE INVENTION

Recently waste products have been important environmental problems, and momentum for reproduction or reuse of polymers has also been gained. Under such trend, a thermoplastic resin is moldable again owing to increase in fluidity by heating, and hence the material recycling thereof has made progress. However, on the other hand, in the case of resins such as thermosetting resins and crosslinked polymers, elastomers and the like, heating does not break three-dimensional network of their molecules and hence does not cause fluidization and causes carbonization while keeping their shapes, and therefore the reproduction thereof is difficult. Thus, under the present situation, in many cases they are subjected to waste disposal such as landfill, although in some cases thermal recycling is carried out.

Also with regard to such thermosetting resins and crosslinked polymers, trend for trying to carry out material recycling has increased, and techniques making it possible have appeared. For example, a process of breaking three-dimensional network structure in molecules to produce a thermoplastic material for reuse, and a process of cutting principal chains to produce a low molecular weight wax, which is reused as an additive for resins, have been considered.

In order to use such processes in a processing power of practical scale, a process for treating continuously is indispensable, and use of an extruder is suitable for continuous treatment. In order to break and thermoplasticize three-dimensional network in molecules of thermosetting resins and crosslinked polymers, heat and pressure are necessary, and it is possible to easily obtain the necessary conditions by use of an extruder. The similar thing is applicable also to the case of producing a wax. Furthermore, when thermoplasticization is carried out, in many cases a thermoplastic resin or a reactant is added together with thermosetting resins or crosslinked polymers, and it is also possible to easily introduce such an additive by use of an extruder.

A primary or secondary amine in JP-A-8-300352 and water in JP-A-2001-253967 act as a reactant thermoplasticizing thermosetting resins or crosslinked polymers by chemical reaction. However, these literatures disclose nothing about separation of the treated product exhausted from an extruder and the reactant used for the degradation.

Furthermore, JP-A-2002-249618 discloses nothing about reaction of a polymer and a reactant under mixing and stirring by an extruder, and JP-A-2000-198877 does not disclose a step of molding a decomposed resin.

The present inventors have found that when a mixture of such a treated product and a reactant is exhausted from the high temperature and high pressure conditions in an extruder to the outside of the extruder, the mixture is separated into the viscous liquid treated product and the gaseous reactant, and when they are introduced directly to a molding means, the gaseous reactant is intermittently ejected and pressure change is very large and hence it is difficult to carry out uniform molding continuously. Furthermore, when a reactant is expensive, it is requested to recover and reuse it. In the prior art, it was necessary to vacuum up a reactant through an evacuation equipment using a grand vacuum pump or the like, and there was a problem of interfusion of impurities in vacuuming up.

The object of the present invention resides in providing a method and instrument of polymer processing treatment, wherein sudden pressure change due to expansion by gasification of a reactant when it is exhausted from a reacting extruder is given in a little amount to a molding machine for a treated substance, and a change in the amount of the material supplied to the molding machine and a variation in molding are little, and hence continuous and uniform molding is possible.

Other objects, features and advantages of the invention will become apparent from the following description of the embodiments of the invention taken in conjunction with the accompanying drawings.

Figure 1:
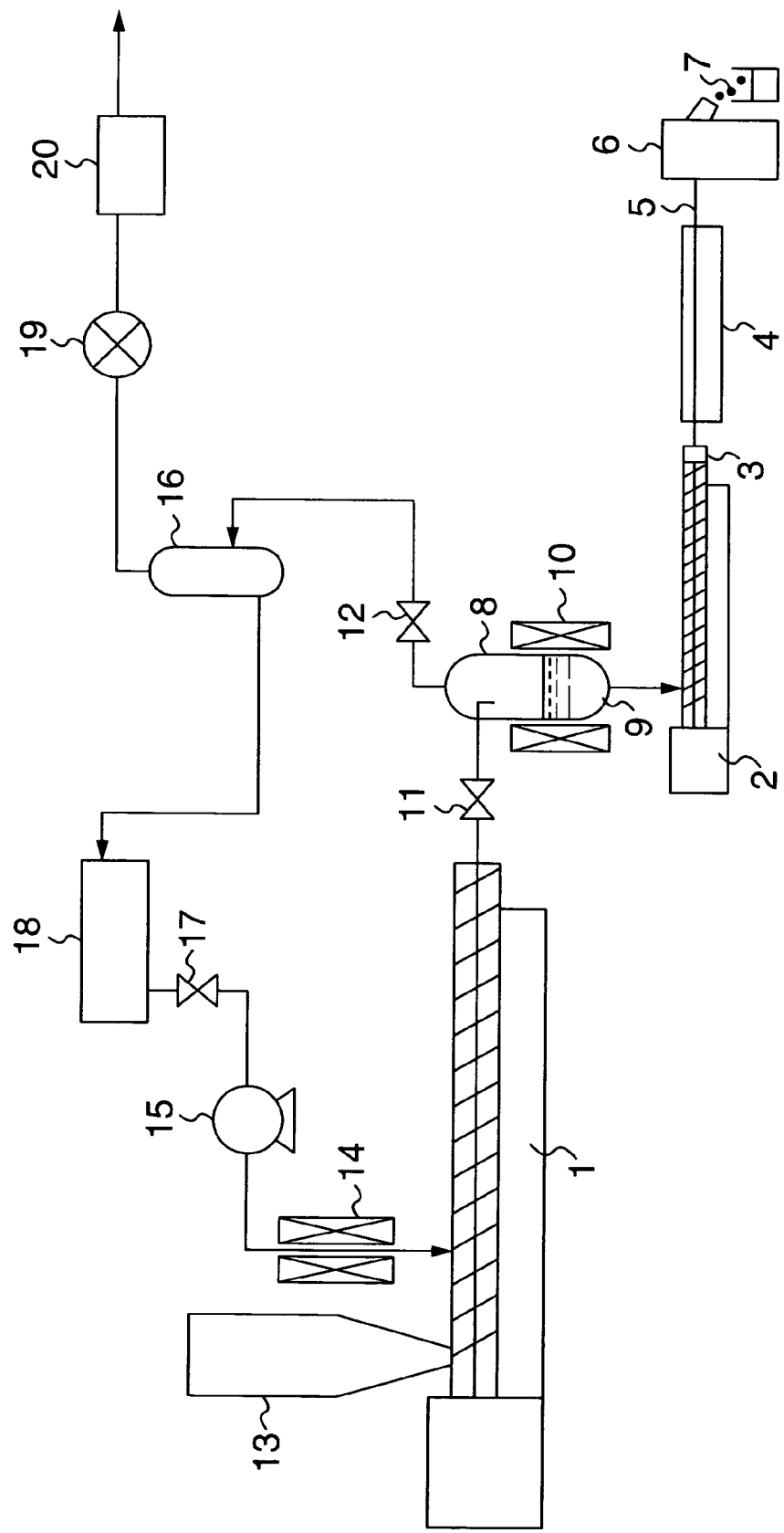
FIG. 1 is a system diagram showing the entire constitution of the instrument of polymer processing treatment according to the present invention.

The numerals in the drawings have the following meanings:

| | |
|---|---|
| 1 reacting extruder, | 2 molding extruder, |
| 3 die, | 4 cooling device, |
| 5 strand, | 6 strand cutter, |
| 7 pellet, | 8 reactant-separation tank, |
| 9 treated substance, | |
| 10 reactant-separation tank heater, | |
| 11 pressure-reducing valve, | |
| 12 tank pressure-adjusting valve, | |
| 13 hopper for raw materials, | 14 heater for reactant, |
| 15 pressurizing pump for reactant, | |
| 16 impurities-separation tank, | |
| 17 reactant tank valve, | 18 reactant tank, |
| 19 blower, | 20 combustion equipment, |
| 50 heat medium-circulating equipment, | |
| 51 jacket for heat medium, | |
| 70 pressure gauge and pressure transmitter, | |
| 71 pressure control device, and | |
| 72 signal-transmitting line. | |

DETAILED DESCRIPTION OF THE INVENTION

In view of the above-mentioned problems, the present invention has been accomplished by studying various techniques for making continuous uniform molding possible for a molding machine. That is, concretely, the present invention provides a method of polymer processing treatment, which comprises the steps of: introducing a polymer and a reactant into a reacting extruder and reacting them therein under mixing and stirring at a high temperature and a high pressure to produce a treated substance; introducing said treated substance and a remaining reactant into a reactant-separation tank to separate the treated substance and the reactant; and molding the separated treated substance.

Furthermore, in the present invention, preferably, said reactant-separation tank is kept at a high temperature and the pressure of the inside thereof is adjusted by a pressure-adjusting means, and said treated substance and reactant are introduced into said reactant-separation tank after their pressure is adjusted at a value lower than an outlet pressure of said reacting extruder by said pressure-adjusting means, and said separated treated substance is molded by a molding extruder; or said treated substance and reactant are introduced into said reactant-separation tank and said molding is carried out by extruding said separated treated substance from said reactant-separation tank by said pressure-adjusting means.

Moreover, preferably, the present invention further includes an impurities-separating step of separating impurities from said reactant separated in said reactant-separation tank and a reactant-reserving step of reserving said reactant separated from the impurities and introducing it into said reacting extruder; and further includes a cooling step of cooling said molded treated substance and a cutting step of cutting said cooled treated substance.

Furthermore, in the present invention, preferably said reaction is a degeneration reaction, a decomposition reaction or a crosslink-cutting reaction which cuts crosslinking bond or molecular chains of a crosslinked polymer to produce a thermoplastic resin or a wax.

Moreover, the present invention provides an instrument of polymer processing treatment, which comprises: a reacting extruder for reacting a pulverized polymer with a reactant under mixing and stirring at a high temperature and a high pressure to produce a treated substance;

a reactant-separation tank for separating said treated substance and reactant; and a molding extruder for molding the separated treated substance.

Furthermore, the present invention provides an instrument of polymer processing treatment, which comprises: a reacting extruder for reacting a pulverized polymer with a reactant under mixing and stirring at a high temperature and a high pressure to produce a treated substance; and a reactant-separation tank for separating said treated substance and reactant; wherein the separated treated substance is molded by a molding means provided at said reactant-separation tank.

Preferably, said reactant-separation tank has a heating means for heating to a high temperature capable of fluidizing said treated substance and a pressure-adjusting means for keeping a pressure in said reactant-separation tank at a constant value; and said heating means is an electric heater provided at an outer wall of the treated substance-reserving portion of said reactant-separation tank; or said heating means has: a jacket which is for circulating a heat medium and which is provided at an outer wall of the treated substance-reserving portion of said reactant-separation tank, and a heat medium-circulating equipment for supplying said heat medium to said jacket.

That is, desirably, the reactant-separation tank is prevented from releasing heat so that the resin is not hardened by cooling therein, or has a heating means for keeping the temperature capable of fluidizing the treated thermoplastic or waxy polymer or a higher temperature to keep from 150 to 200° C. As the heating means, it is possible to provide a jacket having mechanism for circulating heat medium on the outer wall of the reactant-separation tank or to provide an electric heater on the outer wall of the reactant-separation tank.

Preferably, the instrument of polymer processing treatment according to the present invention further comprises: an impurities-separating tank for separating impurities in said reactant separated from said treated substance and a reactant-reserving tank for reserving said reactant separated from the impurities and introducing it into said reacting extruder; and further comprises: a cooling device for cooling said molded treated substance and a cutting machine for cutting said cooled treated substance.

Furthermore, more continuous, uniform and stable molding becomes possible by providing a pressure gauge for measuring the inner pressure of a reactant-separation tank and a pressure control device for detecting change of the measured value from the pressure gauge and adjusting the pressure in the reactant-separation tank by exhausting gas components out of the reactant-separation tank so that the pressure in the reactant-separation tank is kept at a constant value, in order to restrain pressure change. As the pressure control device, an electrically-operated, air-operated or other means-operated valve or actuator can be used.

Such polymer treatment becomes possible concretely by an instrument of polymer processing treatment which comprises a reacting extruder having introduction inlets for introducing a polymer and a reactant respectively, wherein the reactant is introduced through a heater for the reactant and a pump for pressurizing the reactant, and wherein the introduced polymer and reactant are mixed and temperature and pressure are raised; a reactant-separation tank for separating the reactant from a mixture of the treated substance and the reactant exhausted from the reacting extruder; and a molding means for molding the treated substance.

As stated above, in the present invention a reactant-separation tank is provided, and therefore, even when a viscous liquid of treated substance and a gas of reactant are intermittently exhausted from the outlet of an extruder, the reactant-separation tank exhibits buffer action against pressure change, and pressure change in the subsequent process is reduced and thus continuous and uniform molding can be accomplished. Furthermore, when a reactant-separation tank is kept at a pressure higher than atmospheric pressure, the pressure in the reactant-separation tank makes it easy to extrude a treated substance to out of the reactant-separation tank and introduce it to a molding means, and moreover a reactant can be recovered at atmospheric pressure.

The polymer referred to in the present invention includes a synthetic polymer of thermosetting resin such as crosslinked polymer, plastics, elastomer and the like, and furthermore a natural polymer such as lignin, cellulose, protein and the like, and moreover a mixture of the synthetic polymer and the natural polymer. In addition, a mixture consisting mainly of a polymer and containing other materials such as automotive shredder residue may be used.

Particularly, when a crosslinked polymer is used as a polymer and alcohols or mixtures containing alcohols are used as a reactant, such an instrument constitution functions effectively. Furthermore, such an instrument constitution makes a reaction by a reactant easy and hence is extremely effective for restraining a pressure change in the case of using a high pressure such as supercritical condition.

DESCRIPTION OF EMBODIMENTS

Example 1

FIG. 1 is a flow diagram showing an example of the apparatus for cutting treatment of crosslinks of a crosslinked polyethylene according to the present invention. A pelletized crosslinked polyethylene is charged into the reacting extruder 1 through the hopper 13. On the other hand, ethanol required for reaction is supplied from the reactant tank 18, passed through the reactant tank valve 17, pressurized by the reactant-infusing pump 15, heated by the reactant heater 14, and infused into the reacting extruder 1. As the infusing position, the position at which the concentration of the crosslinked polyethylene becomes sufficiently high in the reacting extruder 1 is preferable, and thereby leakage due to gasification of the reactant is prevented. As the reacting extruder 1, it is desirable to use a twin-screw extruder having two screws so that the reactant of high temperature and high pressure does not flow back and kneading is sufficiently carried out. It is necessary for the reactant-infusing pump 15 to increase pressure to a value not less than the inner pressure of the reacting extruder 1, and it is desirable for the reactant heater 14 to raise temperature to the extent that the polymer temperature raised is not lowered in the reacting extruder 1. In the reacting extruder 1, the crosslinked polyethylene charged and the reactant infused are mixed and stirred by screws. On this occasion, if at least a portion of the reacting extruder 1 is under the conditions of temperature and pressure making ethanol as a reactant supercritical, the crosslink-cutting reaction between crosslinked polyethylene and ethanol proceeds suddenly and sufficiently and good treated substance 9 can be obtained.

A mixture of the treated substance of crosslinked polyethylene plasticized in the reacting extruder 1 and ethanol as a reactant is reduced in pressure by the pressure-reducing valve 11 and sent therefrom to the reactant-separation tank 8 at a pressure slightly higher than atmospheric pressure. In the reactant-separation tank 8 the mixture is separated into the treated substance 9 of viscous liquid and the gaseous reactant. The reactant-separation tank 8 is heated by the electric heater 10 for the reactant-separation tank and kept at a temperature making the treated substance 9 fluid. Furthermore, the inside of the reactant-separation tank 8 is kept at a pressure higher than atmospheric pressure, and thereby the treated substance 9 is easily exhausted out of the reactant-separation tank 8. The treated substance 9 exhausted out of the reactant-separation tank 8 is sent to the molding extruder 2 and molded by the die 3 at the front edge thereof. As the molding extruder 2, a single screw or twin-screw extruder can be used. Therein the treated substance 9 is molded into a thready strand 5, which is cooled and solidified at almost ambient temperature by the cooling device 4 and cut by the strand cutter 6 into pellets 7.

On the other hand, the ethanol reactant separated from the treated substance 9 in the reactant-separation tank 8 is adjusted at atmospheric pressure through the tank pressure-adjusting valve 12, and sent to the impurities-separating tank 16. In the impurities-separating tank 16, the impurities which arose during the reaction and interfused in the ethanol reactant, are separated from the ethanol by using difference in their boiling points. The ethanol is returned to the reactant tank 18, and the impurities are vacuumed up by the blower 19 and burned and made harmless by the combustion equipment 20.

In such an instrument constitution, when the liquid treated substance 9 and the gaseous reactant are passed not continuously but alternately through the pressure-reducing valve 11, the gaseous reactant expands from the compression state and hence is ejected strongly with the liquid treated substance 9 entrained. Even in this case, the reactant-separation tank 8 exhibits buffer action against pressure change because it has a relatively large volume, and restrains pressure change after the reactant-separation tank 8. Therefore, continuous and smooth molding is made possible.

Furthermore, the treated substance 9 is kept at a constant temperature by the reactant-separation tank heater 10, and hence when it is supplied therefrom to the molding extruder 2, uniform supply little in temperature change and little in viscosity change is made possible. If the reactant-separation tank 8 is not provided, pressure change due to expansion of the gas is large and gives influence directly to the molding side, and therefore the amount of material supplied to the molding extruder 2 changes and variation in molding tends to be caused. Moreover, it is necessary to reduce the pressure of the system in order to exclude the gaseous reactant.

However, in the present Example, the reactant-separation tank 8 is provided at the stage after the reacting extruder 1, and hence even after the plasticization reaction caused at a high pressure, change in the amount of material supplied to the molding extruder 2 is little, and therefore variation in molding is scarcely caused and uniform molding is made possible.

Example 2

Figure 2:
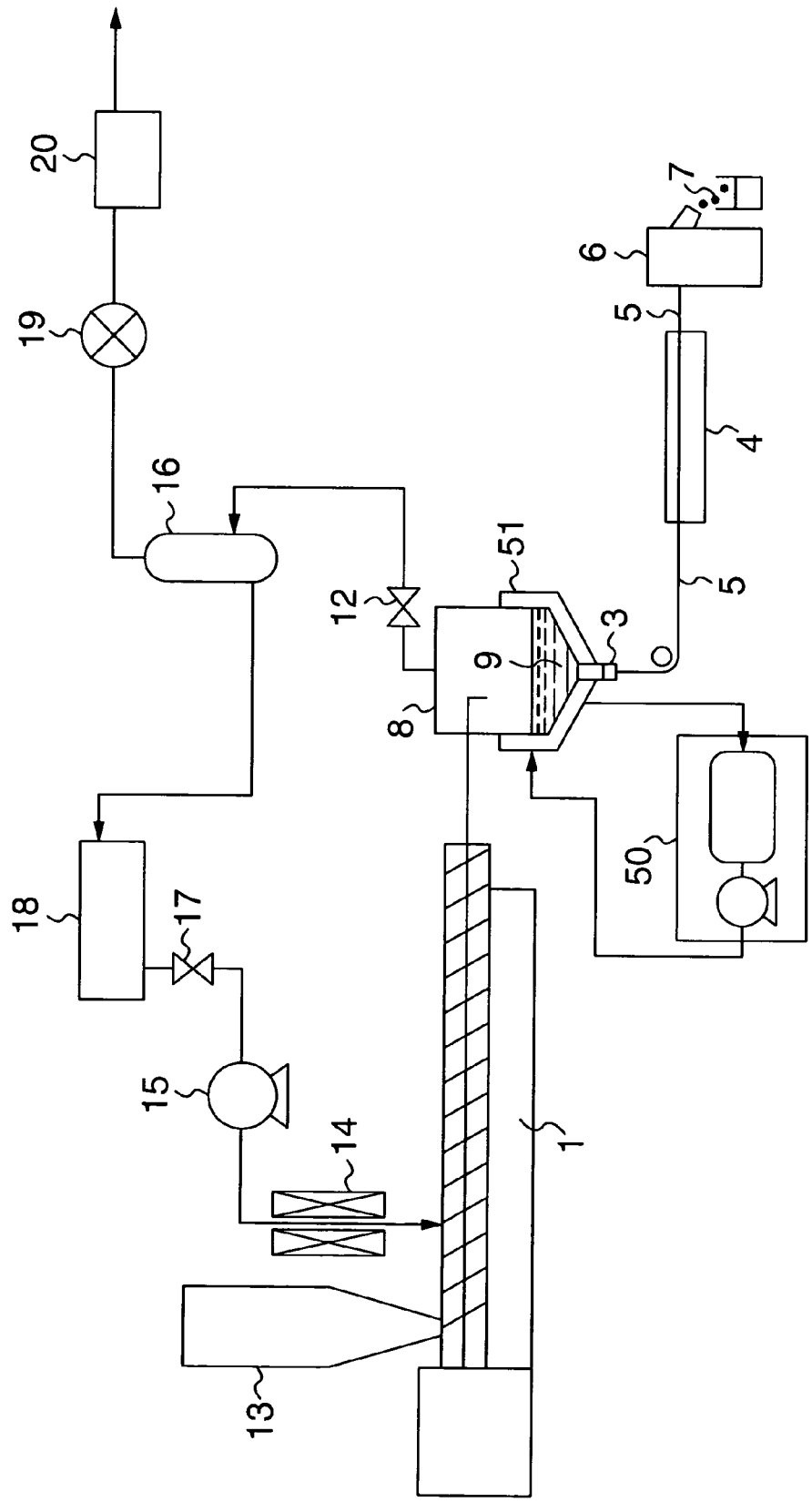
FIG. 2 is a system diagram showing the entire constitution of another instrument of polymer processing treatment according to the present invention.

FIG. 2 is a flow diagram showing another example of an apparatus for cutting treatment of. crosslinks of a crosslinked polyethylene according to the present invention. A thermosetting resin or a crosslinked polymer in the state of pellets is charged into the reacting extruder 1 from the hopper 13 similarly to Example 1. On the other hand, ethanol as a reactant for cutting crosslinks is passed through the reactant tank 18, the reactant tank valve 17, the reactant-infusing pump 15, and the reactant heater 14, and is injected into the reacting extruder 1.

The thermosetting resin or crosslinked polymer kept at a high temperature and a high pressure in supercritical state in the reacting extruder 1 is plasticized by reaction with ethanol in supercritical state. A mixture of the treated substance 9 thus plasticized and the reactant is sent to the reactant-separation tank 8, wherein the mixture is separated into the treated substance 9 and the gaseous ethanol. The jacket 51 for circulating heat medium is provided on the outer wall of the reactant-separation tank 8, and the heat medium heated by heat exchange is circulated through the jacket 51 by the heat medium-circulating equipment 50, and therefore the reactant-separation tank 8 is kept at a temperature not less than the temperature fluidizing the treated substance 9. The reactant-separation tank 8 is kept at a pressure higher than atmospheric pressure by the tank pressure-adjusting valve 12. Thereby, the treated substance 9 is pushed to the lower portion of the reactant-separation tank 8 and molded into the strand 5 through the die 3 provided at the front edge thereof. The strand 5 is cooled and solidified by the cooling device 4 and cut by the strand cutter 6 into pellets 7.

On the other hand, the gaseous reactant separated in the reactant-separation tank 8 is sent to the impurities-separating tank 16. Therein the impurities produced during the reaction and the reactant are separated, and the impurities are vacuumed up by the blower 19 and sent to the combustion equipment 20. The reactant separated from the impurities is returned to the reactant tank 18, that is, recycled.

In the present Example different from Example 1, there is not a pressure-reducing valve or the like between the reacting extruder 1 and the reactant-separation tank 8, but even in this case pressure change is restrained by the reactant-separation tank 8 having a volume corresponding to the processing power of the reacting extruder 1 and the tank pressure-adjusting valve 12, and in molding continuous and uniform strand 5 can be obtained.

Furthermore, unlike heating by an electric heater in Example 1, in the present Example the reactant-separation tank 8 is heated by a heat medium. If the temperature retaining fluidity of the treated substance 9 can be kept, any heating method can be used as in these Examples.

Example 3

Figure 3:
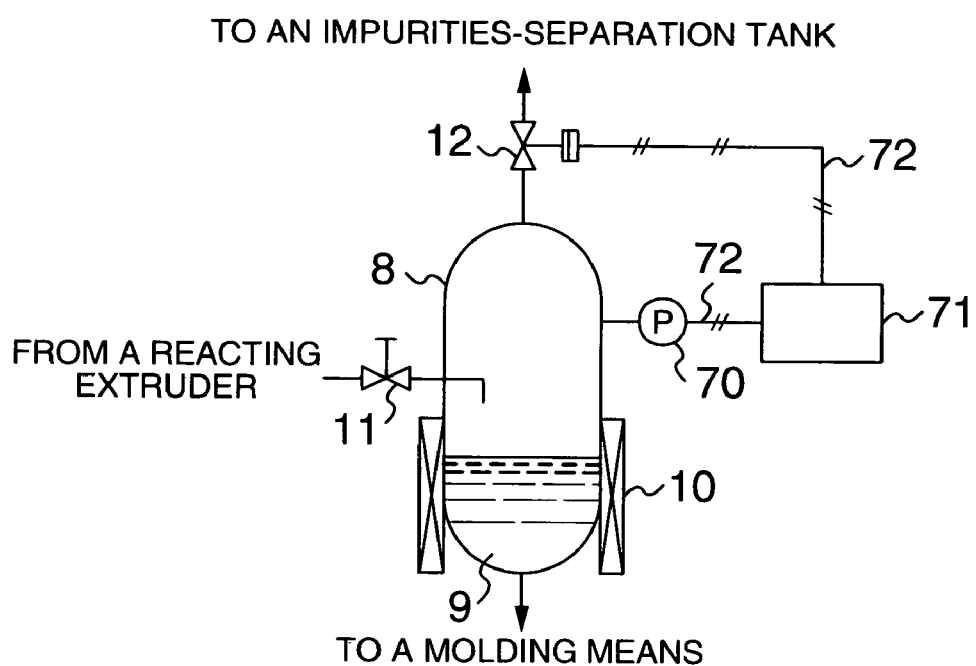
FIG. 3 is a schematic view of the reactant-separation tank and a tank pressure-adjusting mechanism in the present invention.

FIG. 3 is a system diagram showing the pressure-adjusting mechanism of the reactant-separation tank provided at the stage after the reacting extruder according to the present invention. The mixture of treated substance 9 and reactant exhausted from the reacting extruder 1 in Example 1 is reduced in pressure from a pressure in the reacting extruder 1 to 1-tens atoms by the pressure-reducing valve 11, and then enters the reactant-separation tank 8 to be separated into the treated substance 9 of viscous liquid and the gaseous reactant. In the pressure reduction by the pressure-reducing valve 11, the gaseous reactant which has been compressed under high pressure, expands and accordingly is ejected into the reactant-separation tank 8. On this occasion, pressure change can be restrained to some extent, since the volume of the reactant-separation tank 8 is large as compared with that of the gas evolved. By providing the following mechanism thereon, much further stabilization of pressure can be accomplished.

That is, the pressure in the reactant-separation tank 8 is measured by the pressure gauge and pressure transmitter 70, and the value measured is transmitted to the pressure control device 71 through the signal-transmitting line 72. In accordance with the pressure signal transmitted, the pressure control device transmits valve-switching signal to the tank pressure-adjusting valve 12 through the signal-transmitting line 72. The tank pressure-adjusting valve 12 is an air-operated valve and adjusts the valve travel in accordance with the signal. On this occasion, the valve travel is adjusted so that the pressure in the reactant-separation tank 8 becomes constant.

As another method for adjusting pressure, pressure may be adjusted by collaboration of the pressure-reducing valve 11 and the tank pressure-adjusting valve 12. In this case, in addition to the above-mentioned pressure gauge and pressure transmitter 70, a means for measuring pressure difference between before and after the pressure-reducing valve 11 is provided, and pressure is controlled so that both the front pressure and the rear pressure become constant. In the case of controlling pressure by both the pressure-reducing valve 11 and the tank pressure-adjusting valve 12, if both of the valves are controlled by only the signal of tank pressure, the two valve actions interfere with each other and retaining of a pressure becomes unstable, and therefore, in controlling of the pressure-reducing valve 11 it is desirable to use as a signal the pressure difference between before and after the valve as mentioned above, and in controlling of the tank pressure-adjusting valve 12 it is desirable to use as a signal the pressure itself of the reactant-separation tank 8.

By these mechanisms, the pressure in the reactant-separation tank 8 is always kept at an almost constant value, and continuous and uniform extrusion molding is made possible in a molding means at the stage after the reactant-separation tank 8.

It should be further understood by those skilled in the art that although the foregoing description has been made on embodiments of the invention, the invention is not limited thereto and various changes and modifications may be made without departing from the spirit of the invention and the scope of the appended claims.

EFFECTS OF THE INVENTION

According to the present invention, after treating a polymer with a reactant by use of a reacting extruder, when the resultant treated substance is molded in a molding machine, pressure change in the material supply can be restrained. Therefore, the present invention can provide a method and instrument of polymer processing treatment, wherein a pressure change due to an expansion by gasification of the reactant is given in a little amount to the molding machine for the treated substance, and a change in the amount of the material supplied to the molding machine and a variation in molding are little, and hence a continuous and uniform molding is possible.

What is claimed is:

1. A method of polymer processing treatment, which comprises the steps of:

reacting a polymer with a reactant under mixing at a high temperature and a high pressure in the inside of a reacting extruder to produce a treated substance;

then introducing said treated substance and a remaining reactant into a reactant-separation tank, thereby separating said treated substance and said remaining reactant to provide a separated treated substance;

then molding said separated treated substance to provide a molded treated substance; and separating impurities from said remaining reactant separated in said reactant-separation tank.

2. The method of polymer processing treatment according to claim 1, wherein said reactant-separation tank is kept at a high temperature and the pressure of the inside thereof is adjusted by a pressure-adjusting means.

3. The method of polymer processing treatment according to claim 2, wherein said treated substance and said remaining reactant are introduced into said reactant-separation tank after their pressure is adjusted at a value lower than an outlet pressure of said reacting extruder by said pressure-adjusting means, and said separated treated substance is molded by a molding extruder.

4. The method of polymer processing treatment according to claim 2, wherein said separated treated substance is exhausted from said reactant-separation tank by keeping a pressure in said reactant-separation tank higher than atmospheric pressure by said pressure-adjusting means, and said molding is carried out by extruding said separated treated substance exhausted from said reactant-separation tank.

5. The method of polymer processing treatment according to claim 1, which further includes:

a reactant-reserving step of reserving said remaining reactant separated from the impurities and introducing it into said reacting extruder.

6. The method of polymer processing treatment according to claim 1, which further includes:

a cooling step of cooling said molded treated substance to provide a cooled treated substance; and then a cutting step of cutting said cooled treated substance.

7. The method of polymer processing treatment according to claim 1, wherein said reaction is a degeneration reaction, a decomposition reaction or a crosslink-cutting reaction.

8. The method of polymer processing treatment according to claim 1, wherein said polymer is a crosslinked polymer and said reactant is selected from alcohols or a mixture containing alcohols.

9. The method of polymer processing treatment according to claim 1, wherein said polymer is a synthetic polymer of thermosetting resin, a natural polymer or a mixture of a synthetic polymer and a natural polymer.

10. The method of polymer processing treatment according to claim 1, wherein said polymer comprises a mixture of a polymer and automotive shredder residue.

11. The method of polymer processing treatment according to claim 1, wherein said polymer comprises pelletized crosslinked polyethylene, said reactant is ethanol and said reaction is a crosslink-cutting reaction.

12. The method of polymer processing treatment according to claim 8, wherein said polymer comprises pelletized crosslinked polyethylene, said reactant is ethanol and said reaction is a crosslink-cutting reaction.

13. The method of polymer processing treatment according to claim 8, wherein said reaction is a crosslink-cutting reaction.

* * * * *